United States Patent
Schubert et al.

(10) Patent No.: US 11,604,957 B1
(45) Date of Patent: Mar. 14, 2023

(54) METHODS FOR DESIGNING HYBRID NEURAL NETWORKS HAVING PHYSICAL AND DIGITAL COMPONENTS

(71) Applicant: X Development LLC, Mountain View, CA (US)

(72) Inventors: Martin Friedrich Schubert, Mountain View, CA (US); Brian John Adolf, San Mateo, CA (US); Jesse Lu, East Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 613 days.

(21) Appl. No.: 16/576,946

(22) Filed: Sep. 20, 2019

(51) Int. Cl.
*G06N 3/04* (2006.01)
*G06N 3/063* (2006.01)

(52) U.S. Cl.
CPC ............... *G06N 3/04* (2013.01); *G06N 3/063* (2013.01)

(58) Field of Classification Search
CPC .................................. G06N 3/04; G06N 3/063
See application file for complete search history.

(56) References Cited

U.S. PATENT DOCUMENTS

| | | |
|---|---|---|
| 6,356,681 B1 | 3/2002 | Chen |
| 6,408,119 B1 | 6/2002 | Meltz et al. |
| 6,456,762 B1 | 9/2002 | Nishiki |
| 6,477,194 B1 | 11/2002 | Eng |
| 6,681,067 B1 | 1/2004 | Kersey |
| 6,768,850 B2 | 7/2004 | Dugan et al. |
| 6,847,762 B2 | 1/2005 | Sweetser et al. |
| 6,946,684 B2 | 9/2005 | Shigihara |
| 6,956,994 B2 | 10/2005 | Bernard |
| 8,380,027 B2 | 2/2013 | Reed |
| 10,592,732 B1 | 3/2020 | Sather et al. |
| 11,011,884 B1 * | 5/2021 | Schubert ............... H01S 5/1003 |
| 11,092,746 B1 * | 8/2021 | Adolf .................. G02B 6/02123 |
| 2003/0186142 A1 | 10/2003 | Deshmukh et al. |
| 2004/0028104 A1 | 2/2004 | Buda |

(Continued)

OTHER PUBLICATIONS

Chandler, "New system allows optical "deep learning"," Jun. 2017, retrieved on Oct. 9, 2018, retrieved from URL <http://news.mit.edu/2017/new-system-allows-optical-deep-learning-0612>, 3 pages.

(Continued)

*Primary Examiner* — Stephen G Sherman
(74) *Attorney, Agent, or Firm* — Fish & Richardson P.C.

(57) ABSTRACT

Systems and methods for designing a hybrid neural network comprising at least one physical neural network component and at least one digital neural network component. A loss function is defined within a design space composed of a plurality of voxels, the design space encompassing one or more physical structures of the at least one physical neural network component and one or more architectural features of the digital neural network. Values are determined for at least one functional parameter for the one or more physical structures, and the at least one architectural parameter for the one or more architectural features, using a domain solver to solve Maxwell's equations so that a loss determined according to the loss function is within a threshold loss. Final structures are defined for the at least one physical neural network component and the digital neural network component based on the values.

20 Claims, 6 Drawing Sheets

(56) References Cited

U.S. PATENT DOCUMENTS

| | | |
|---|---|---|
| 2004/0196884 A1 | 10/2004 | Ohkubo |
| 2005/0226558 A1 | 10/2005 | Kim et al. |
| 2006/0078258 A1 | 4/2006 | Anisimov et al. |
| 2008/0013581 A1 | 1/2008 | Kobayashi |
| 2008/0089374 A1 | 4/2008 | Eichler |
| 2010/0142566 A1 | 6/2010 | Liu et al. |
| 2011/0102799 A1 | 5/2011 | Matejka et al. |
| 2016/0012176 A1 | 1/2016 | Liu et al. |
| 2016/0164260 A1 | 6/2016 | Chua |
| 2017/0179680 A1 | 6/2017 | Mahgerefteh |
| 2018/0024297 A1 | 1/2018 | Bovington et al. |
| 2018/0045953 A1 | 2/2018 | Fan et al. |
| 2018/0053334 A1 | 2/2018 | Schneider |
| 2019/0097722 A1 | 3/2019 | McLaurin et al. |
| 2019/0179016 A1 | 6/2019 | Raring et al. |
| 2020/0050715 A1 | 2/2020 | Krishnannurthy et al. |
| 2020/0226221 A1 | 7/2020 | Lu et al. |
| 2021/0007702 A1* | 1/2021 | Lee ..................... A61B 6/584 |
| 2021/0305767 A1 | 10/2021 | Schubert et al. |

OTHER PUBLICATIONS

Lee et al., "Metasurface eyepiece for augmented reality," Nature Communications, Nov. 2018, 10 pages.

Molesky, "Outlook for inverse design in nanophotonics," https://arxiv.org/abs/1801.06715, Jan. 2018, 13 pages.

Piggott et al., "Fabrication-constrained nanophotonic inverse design," Scientific Reports, May 2017, 7 pages.

Piggott et al., "Supplementary Information: Fabrication-constrained nanophotonic inverse design," retrieved from URL <https://static-content.springer.com/esm/art%3A10.1038%2Fs41598-017-01939-2/MediaObjects/41598_2017_1939_MOESM2_ESM,pdf>, May 2017, 10 pages.

Tahersima et al., "Deep Neural Network Inverse Design of Integrated Nanophotonic Devices," https://arxiv.org/abs/1809.03555, Sep. 2018, 8 pages.

Bernhardi, "Fourteen Philosophy Thesis Topic Ideas for University Students," Dissertation for the degree of Doctor University of Twente, Integrated Optical MicroSystems (IOMS) group. Faculty of Electrical Engineering, Mathematics and Computer Science, MESA+ Institute for Nanotechnology, Apr. 1982, 169 pages.

Frei et al., "Topology optimization of a photonic crystal waveguide termination to maximize directional emission," Appl. Phys. Lett. 86, Mar. 2005, 86:111114.

Udupa et al., "Voxelized Topology Optimization for Fabrication Compatible Inverse Design of 3D Photonic Devices," Optics Express, Jul. 2019, 27(15):21988-21998.

Yin, "Photonic Inverse Design for 3-D Structures and Optical Phase Change Materials," Massachusetts Institute of Teclmology, Jun. 2019, 85 pages.

Borel et al., "Topology optimization and fabrication of photonic crystal structures," Optics Express, May 2004, 12(9):6 pages.

Boutanni et al., "Efficient pixel-by-pixel optimization of photonic devices utilizing the Dyson's equation in a Green's function formalism: Part II. Implementation using standard electromagnetic solvers," Journal of the Optical Society of America, Sep. 2019, 36(9)2387-2394.

Molesky et al., "Inverse design in nanophotonics," Nature Photonics, Nov. 2018, 12:659-670.

Piggot, "Automated Design of Puotonic Devices," Dissertation for the degree of Doctor of Philosophy, Stanford University, Department of Electrical Engineering, Jun. 2018, 114 pages.

Xu et al., "Navigating through complex photonic design space using machine learning methods," SPIE Optics + Optoelectronics, Apr. 2019, 11031:110310S-1.

Yu et al., "Inverse-Design-based Light via for Multi-Layer Photonic Integration Circuit," 2018 Asia Communications and Photonics Conference, 2018, 3 pages.

Damask, "Integrated-Optic Grating-Based Filters for Optical Communications Systems," Thesis for the degree of Doctor of Philosophy, Massachusetts Institute of Technology, May 6, 1996, 282 pages.

Winick et al., "Design of Grating-Assisted Waveguide Couplers with Weighted Coupling," Journal of Lightwave Technology, Nov. 1991, 9(11):1481-1491.

Mauricio et al., "Design Framework for nnetasurface optics-based convolutional neural networks," Applied Optics, May 2021, 60(15):4356-4365.

Sitzmann et al., "End-to-end Optimization of Optics and Image Processing for Achromatic Extended Depth of Field and Super-resolution Imaging," ACM Trans. Graph., Aug. 2018, 37(4):1-13.

Guo et al. "Study on a Recurrent Convolutional Neural Network Based FDTD Method," 2019 International Applied Computational Electromagnetics Society Symposium—China (ACES), Oct. 31, 2022, 9 pages.

Hughes, "Adjoint-Based Optimization and Inverse Design oh Photonic Devices," Thesis for the degree of Doctor of Philosophy, Stanford University, Department of Applied Physics, Aug. 2019, 158 pages.

Kores et al., "Temperature Dependence of the Spectral Characteristics of Distributed-Feedback Resonators," Optics Express, Feb. 19, 2018, 26(4):4892-905.

Lai et al., "Distributed Bragg Reflector Fiber Laser Fabricated by Frmtosecond Laser Inscription," Optics Letters, Jun. 2006, 31(11): 3 pages.

Li et al. "Enabling High Performance Deep Learning Networks on Embedded Systems," IECON 2017—43rd Annual Conference of the IFEE Industrial Electronics Society, Nov. 1, 2022, 6 pages.

TaherSima et al., "Nanostructured Photonic Power Splitter Design via Convolutional Neural Networks," 2019 Conference on Lasers and Electro-Optics, Oct. 31, 2022, 2 pages.

Wikipedia.com (Online) "Kernel (image processing))," Dec. 7, 2019, retrieved on Oct. 11, 2022, retrieved from URL<https://en.wikipedia.org/w/index.php?title-Kernel_(image_processing)&oldid-929690058>, 6 pages.

Andkjaer et al., "Topology-optimized broadband surface relief transmission grating." Proc. SPIE, Physics and Simulation of Optoelectronic Devices, Mar. 7, 2014, 8980:898006-2.

Ingersoll, "Multiplexed Volume Bragg Gratings in Narrowand Broadband Spectral Systems: Analysis and Application," Thesis for the degree of Philosophy, University of Minnesota, May 2015. 129 pages.

researchgate.net [online], "Optical Multiplexing and Demultiplexing," Apr. 2003, retrieved on Nov. 9, 2022, retrieved from URL<https://www.researchgate.net/publication/229479977_Optical_Multiplexing_and_Demultiplexing/link/61080e5c0c2bfa282a178420/download/>, 2 pages.

Tasyurek, "Wavelength Demultiplexing Using Multilayer Structures With Frustrated Total Internal Reflection," Dissertation for the degree of Doctor of Philosophy, Stanford University, Department of Electrical Engineering, Mar. 2015, 205 pages.

* cited by examiner

METHODS FOR DESIGNING HYBRID NEURAL NETWORKS HAVING PHYSICAL AND DIGITAL COMPONENTS

TECHNICAL FIELD

This disclosure generally relates to methods for designing hybrid neural networks having physical neural network components and digital neural network components.

BACKGROUND

Artificial neural networks (ANN) are computational systems that include a framework for one or more machine learning algorithms to process complex data inputs. Such systems may learn to perform tasks such as image recognition, voice recognition, machine translation, image reconstruction, and so forth. For example, an ANN may learn to identify images that include dogs by analyzing example images that have been designated as "dog" or "no dog" and using the results to identify dogs in other images. ANNs can generate identifying characteristics from the learning material they process and perform inferences on input data based on the learning techniques used. Neural networks can be implemented digitally (e.g., as software) or physically implemented using one or more analog/optical devices.

SUMMARY

Digital neural networks can offer substantial advantages when compared to physical neural networks. For example, digital implementations can allow for ease of conception, configurability, and embedded weight/biases updates. However, when compared to digital implementations, physical neural networks can offer low power consumption, reduced needs for analog-to-digital conversions, and smaller footprints. Therefore, it may be desirable to design a hybrid physical/digital neural network system that can exploit the advantages of each implementation.

This disclosure generally relates to methods of designing hybrid physical/digital neural network systems. The physical/digital neural network systems can include a detector array, one or more physical neural network components, and/or one or more digital neural network components. The one or more physical neural network components can include optical components, such as a scattering volume. For example, optical components can be placed in front of the detector array and be configured to perform physical convolutions by using one or more physical features (e.g., dielectric surfaces, curvatures, holes, etc.) Additionally, or alternatively, the one or more physical components can include electrical components, such as memristors, and/or photonic integrated circuits, that can be communicatively coupled to the detector array and be configured to perform physical computations on an input signal received by the detector array. The input signal can include several types of waves, such as optical waves and/or acoustic waves. The integration of physical neural network components to perform physical convolutions can increase the speed of inference while reducing the computational power requirements of the neural network when compared to purely digital neural network implementations. The neural network systems can also include digital neural network components, such as a convolutional neural network (CNN) implemented on specialized integrated circuitry.

This specification discloses, in some implementations, a hybrid physical/digital neural network in which the two components (that is, the physical and digital components) are co-optimized. Specifically, the intermediate representation lying between physical output and digital input is itself optimized. According to some implementations of the disclosure, the constraint of the intermediate representation on the input is loosened, which can allow the hybrid neural network to explore a larger solution space when compared with conventional systems. To optimize the hybrid neural network, a fixed physical component can be optimized to be well suited for fine-tuning through changes in the digital component. That is, by changing the digital neural network, the hybrid system can be configured for solving newer problems with increased accuracy when compared with traditional systems. In some implementations, the hybrid neural network can include an optical component set in between digital components, and other such arrangements.

In some implementations, this specification discloses methods that include using a computational inverse design tool to give a configuration that maximizes the accuracy of inference with respect to the hybrid neural network system (e.g., including both physical and digital components). The design tool can separate the physical neural network components into a plurality of components, and optimize the type, spacing, number, and features of the physical neural network components. For each configuration of physical neural network components, the design tool also optimizes one or more features of the digital neural network components, such as the weights and biases of the digital neural network.

The loss function can also account for other considerations, including manufacturing penalties, where the tool accounts for the feasibility of the optimized design. For example, it might not be feasible to manufacture alternative voxels associated with the physical neural network components using different materials, and thus a penalty condition specifying an amount of voxels that should have the same materials can be used. The loss function can also take into account manufacturing cost and/or materials available.

In an aspect, a system for designing a hybrid neural network including at least one physical neural network component having one or more physical structures and configured to perform physical computations and at least one digital neural network component having one or more architectural features and configured to perform digital computations, is provided. The system includes one or more processors. The system includes computer storage storing executable computer instructions in which, when executed by the one or more processors, cause the one or more processors to perform one or more operations. The one or more operations include defining a loss function within a design space composed of a plurality of voxels, the design space encompassing the one or more physical structures of the at least one physical neural network component, and the one or more architectural features of the at least one digital neural network component. The loss function corresponds to at least one inference metric of the neural network resulting from: an interaction between an input signal at an operative wavelength of the one or more physical structures of the at least one physical neural network component; and processing, by the at least one digital neural network component, the result of the interaction between the input signal and the one or more physical structures of the at least one physical neural network component. The one or more operations include determining values for at least one functional parameter for the one or more physical structures, and at least one architectural parameter for the one or more architectural features, using a domain solver to solve Maxwell's equations so that a loss determined according to the loss function is within a threshold loss, in which the at least one functional parameter corresponds to a structure of the at least one physical neural network component, and in which the at least one architectural parameter corresponds to an architectural structure of the at least one digital neural network component. The one or more operations include defining a final structure of the at least one physical neural network component based on the values for the at least one structural parameter. The one or more operations include defining a final architectural structure of the at least one digital neural network component based on the values for the at least one architectural parameter.

The final structure of the at least one physical neural network component can include one of more physical features, the one or more physical features including at least one of: a curvature of a scattering plate, a spacing between scattering plates, a substrate, a beam splitter, an amplifier or a modulator. The one or more architectural features can include at least one of: a number of neural network layers, a type of neural network layers, a number of neural network neurons, or a number of neural network channels.

The at least one inference metric of the hybrid neural network can include at least one of an inference speed or an inference accuracy. The input signal can include at least one of an electromagnetic wave or an acoustic wave. The at least one functional parameter can include at least one of: a refractive index, a reflection angle, a diffraction angle, or a transmissivity value. The at least one architectural parameter can include at least one of a weight value or a bias value.

The domain solver can include a finite difference time domain solver. The physical computations can include physical convolutions and the digital computations comprise digital convolutions.

These and other aspects, features, and implementations can be expressed as methods, apparatus, systems, components, program products, means of doing business, means or steps for performing a function, and in other ways, and will become apparent from the following descriptions, including the claims.

DETAILED DESCRIPTION

Figure 1A:
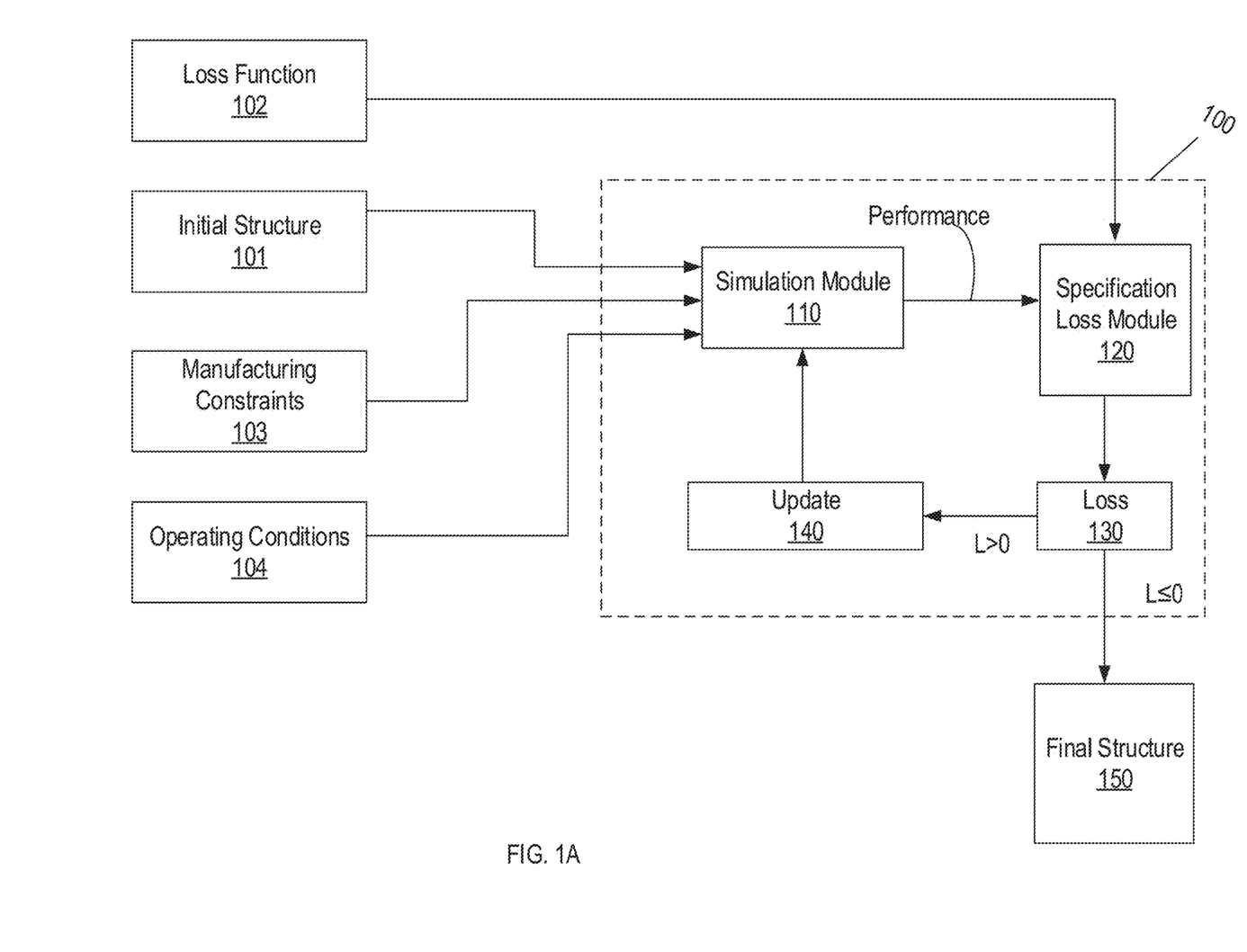
FIG. 1A shows an architecture for a computational inverse design tool that uses a simulation module and a specification loss module to iteratively simulate the performance of an optical device and determine a loss for the device.
Figure 1B:
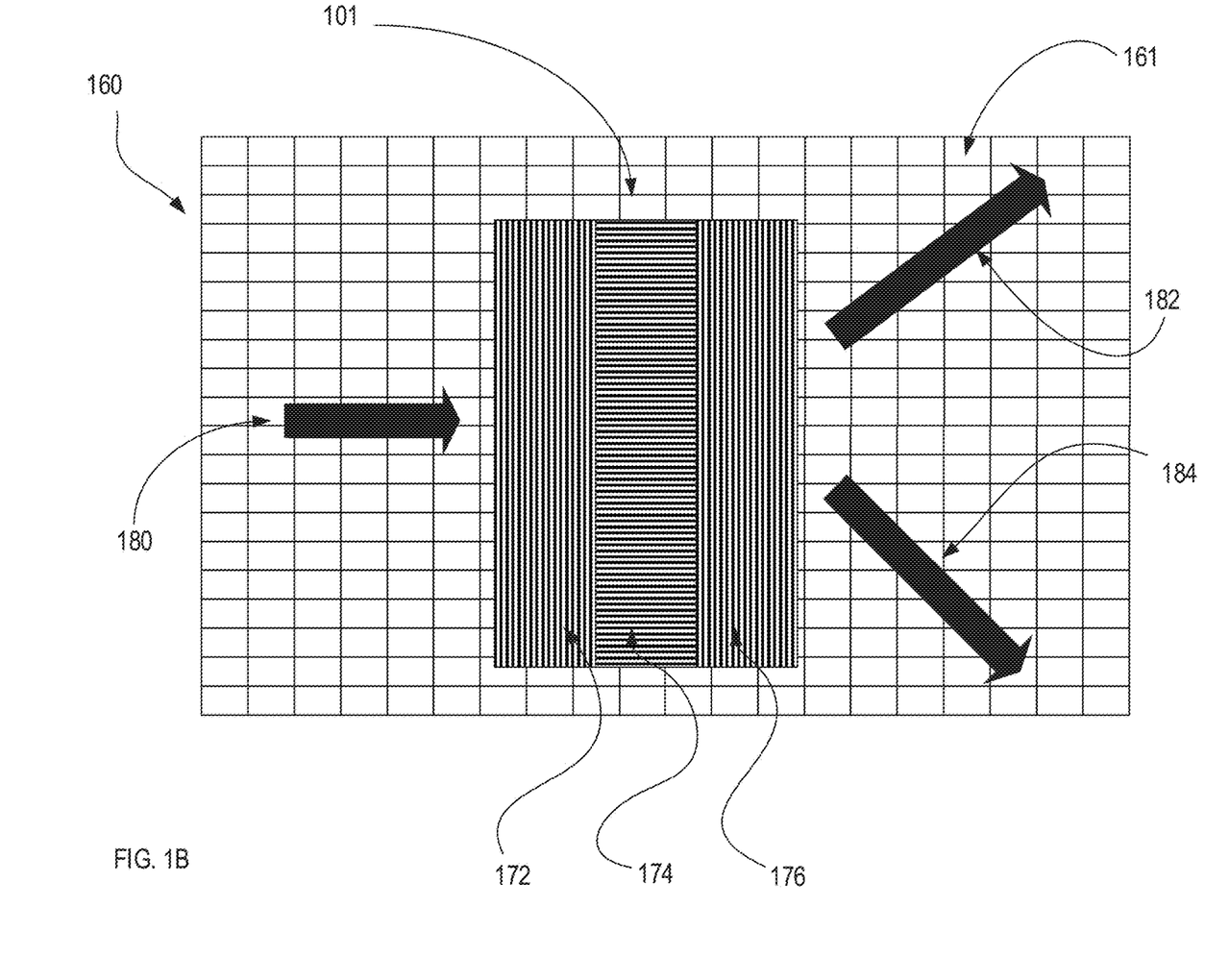
FIG. 1B shows an initial structure for a beam splitter as defined within a simulation space.

Referring to FIGS. 1A-1B, the structure of dispersive optical component 100 is determined using a design tool 100, which refers to a computational engine that determines a design for the optical device that satisfies pre-specified performance criteria, in this case scattering incident light 110 into different directions (120, 122, 124, and 126) depending on the wavelength of the incident light. Such an approach to design is referred to as "inverse design" and the computational engine for solving such problems is referred to as an "inverse design tool."

In certain implementations, the inverse design problem involves having a designer specify the performance criteria for the optical device in terms of a "loss function," L (also sometimes referred to a "cost function"), which represents a variation of the performance of a given design for the optical device from the specified performance. When L is below a specified threshold, e.g., L≤0, for a given design, it signifies that the specified performance has been met. By appropriately defining the loss, the inverse problem can therefore be expressed as finding a design, z, for the optical device which satisfies L≤0.

Inverse design problems can be solved computationally through a combination of a simulation module and a loss module. The simulation module is used to mathematically model a physical system incorporating a given design for the optical device using equations that describe the physical properties of the physical system, such as Maxwell's equations. The simulation module can also mathematically account for constraints involved in manufacturing (e.g., structure sizes and shapes and material properties) and operating the device (e.g., thermal effects). The loss module determines the loss for a particular design, effectively evaluating the performance of the device compared to the desired performance.

FIG. 1A shows an architecture for a computational inverse design tool 100 that uses a simulation module 110 and a loss module 120 to iteratively simulate the performance of an optical device and determine a loss 130 for the device. Depending on whether the loss exceeds (e.g., L>0) or meets (e.g., L≤0) a specified threshold value, the design tool can either update (140) a structure of the device or produces a final structure 150 for the device.

The design tool 100 uses a number of input parameters from a user in order to determine a final structure for the device. These include an initial structure 101 for the optical device, a loss function 102, manufacturing constraints 103 and operating conditions 104. Initial structure 101 generally includes a starting point for the composition and dimensions for the optical device. Loss function 102 is based on the desired performance of the optical device and is typically defined by a desired electric field profile. In many cases, the desired electric field profile corresponds to an electric field output by the optical device in response to a particular input or inputs. Manufacturing constraints 103 incorporate constraints based on practical manufacturing considerations. For example, manufacturing constraints can be associated with an amount of spacing between components, size of one or more components (e.g., size in one dimension, e.g., width, and/or overall size, e.g., volume), radius of curvature of one or more components, maximum cost of potential materials, availability of potential materials, and so forth. Operating conditions 104 account for other physical properties of the system, such as sources or sinks of electromagnetic fields, operating temperature, etc.

Before discussing the application of the inverse design tool to dispersive optical components, it is instructive to consider the example of a simple beam splitter. FIG. 1B shows an initial structure for a beam splitter as defined within a simulation space. Referring also to FIG. 1B, generally, initial structure 101 of the optical device is defined within a simulation space 160 composed of voxels 161. Voxels are three-dimensional volume elements at which physical properties (e.g., refractive index, field values, and temperature) can be defined and/or calculated. Each voxel 161 can be sub-wavelength (e.g., 0.5λ or less, 0.2λ or less, 0.1λ or less, 0.05λ or less) for a particular wavelength of interest in at least one dimension. In many cases, voxels are sub-wavelength in three dimensions.

As illustrated, initial structure 101 is composed of three regions 172, 174, and 176 each composed of a different material. Each extends across multiple voxels. Arrow 180 represents an input electromagnetic field incident on one side of initial structure 101. This field is a component of operating conditions 104, input into the simulation module. Arrows 182 and 184 represent the desired performance (e.g., the desired electric field profile output by the optical device in response to the input electromagnetic field) of the optical device and the loss can be established as a difference, on a voxel by voxel basis, between the electromagnetic field represented by these arrows and the electromagnetic field that results from the interaction between the input electromagnetic field and initial structure 101.

Referring again to FIG. 1A, simulation module 110 determines the performance of the optical device using a differentiable solver for Maxwell's equations to model electromagnetic fields resulting from the one or more sources interacting with the structure defined for the optical device. In one form, Maxwell's equations can be expressed as:

$$\frac{\partial H}{\partial t} = -\frac{1}{\mu}(\nabla \times E - M_{source}); \text{ and } \frac{\partial E}{\partial t} = \frac{1}{\epsilon}(\nabla \times H - J_{source}),$$

where E and H represent electric and magnetic fields, ε and μ represent permittivity and permeability of the material at each voxel, and $J_{source}$ and $M_{source}$ are electric and magnetic currents. Numerical solution of Maxwell's equations yields electric and magnetic field values at each voxel, from which design tool 100 can calculate loss 130 for each voxel using loss module 120.

In some embodiments, a finite difference time domain (FDTD) approach is used to solve Maxwell's equations. Details of such an approach can be found, for example, in *Computational Electrodynamics: the Finite-Difference Time-Domain Method*, Third Edition, by A. Taflove and S. C. Hagness (Artech House, 2005). Such an approach involves updating values of the electric and magnetic fields at each voxel through a series of incremental time steps. Mathematically, this update operation can be expressed by a function φ, where $$x_{i+1} = \phi(x_i, b_i, z)$$

for i=1, . . . , n. Here, n is the total number of time steps for the simulation, $x_i$ refers to the electric and magnetic fields at time step i, $b_i$ represents electric and magnetic sources at time step i, and z is a structural variable, corresponding to the topology of the optical device. Additionally, the loss operation can be expressed as $L=f(x_1, \ldots, x_n)$ and takes as input all the computed fields and produces a single, real-valued scalar that can be minimized.

In such implementations, inverse design tool 100 can optimize a structure for the optical device (i.e., final structure 150 in FIG. 1A) based on a structural gradient, $$\frac{\partial L}{\partial z}$$

according to the formalism above. This structural gradient can be determined according to the relationship:

$$\frac{dL}{dz} = \sum_i \frac{\partial L}{\partial x_i} \frac{\partial x_i}{\partial z}.$$

The above calculations can be performed using a convolutional neural network formalism wherein the matrices representing the FDTD set of equations are sparsely populated such that the calculations can be efficiently performed using one or more tensor processing units.

The loss function, L, for a dispersive optical component can be established in a variety of ways but generally involves defining a desired electric field distribution (or corresponding measure of electric field strength, such as intensity) at multiple wavelengths (or, correspondingly, frequencies) and comparing a simulated electric field distribution to the desired distribution at each of those wavelengths. The comparison can involve simply determining a difference at each voxel for which the desired distribution is defined or a difference of squares.

The loss function is generally defined as at least a plurality of operational wavelengths of the component. For example, in applications where the device is expected to operate at a number of discrete wavelengths of interest, the loss function can incorporate the performance of the device at each of these wavelengths. The number of wavelengths can vary as necessary. For example, some applications can include a large number of wavelengths (e.g., 20 or more wavelengths, 50 or more wavelengths, 100 or more wavelengths) spanning a range of operational wavelengths. Alternatively, the loss function can be defined for a representative subset of the operational wavelengths. For instance, where the operational wavelengths span a range of wavelengths, the loss function can be evaluated for a finite number of discrete wavelengths spanning (e.g., evenly spanning) the operational range.

Figure 2:
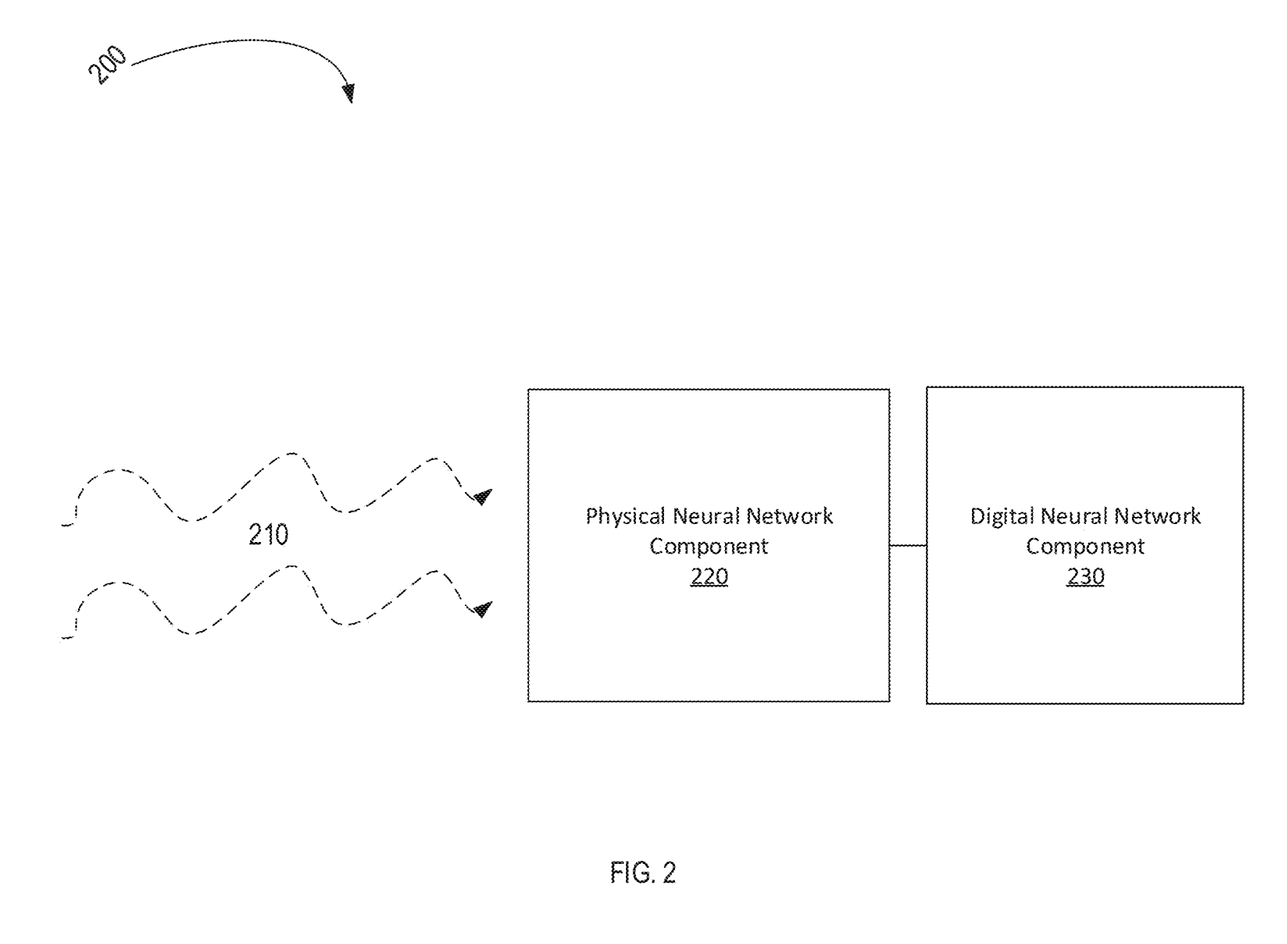
FIG. 2 shows an example of a final structure for a hybrid physical/digital neural network system.

Turning now to the example of a hybrid physical/digital neural network, an example structure of a hybrid physical/digital neural network designed by the methods and systems described in this specification is shown in FIG. 2. The hybrid neural network 200 includes a physical neural network component 220 and a digital neural network component 230.

The physical neural network component 220 is configured to receive an input signal 210 and perform physical computations on the input signal 210. For example, the physical neural network component 220 can receive an input signal 210 and direct one or more portions of the input signal 210 in specific directions in accordance with the physical properties of the input signal and a predetermined computational algorithm. In some embodiments, the input signal 210 includes an acoustic wave and/or an electromagnetic (EM) wave. The physical neural network component 220 includes one or more physical structures that include one or more physical features. For example, the one or more physical structures can include one or more optical devices, such as optical scattering plates (or other scattering media) and photonic integrated circuits, and/or one or more electronic devices such as electronic integrated circuits and/or memristors. For instance, as will be discussed later in more detail with reference to FIG. 3, the physical neural network component 220 can include a scattering volume (which may be referred to as a scattering medium) that can cause an input signal 210 to diffract, refract, and/or reflect in accordance with the properties of the scattering volume and the input signal. Additionally, or alternatively, the physical neural network component 220 can include one or more electronic components and/or one or more integrated circuits (e.g., electronic integrated circuits, photonic integrated circuits, etc.) configured to perform physical convolutions, as described later with reference to FIG. 3.

After performing the physical convolutions, the digital neural network component 230 receives an output signal from the physical neural network component 220. The output signal from the physical neural network component 220 reflects the input signal having one or more physical convolutions performed thereon. In some embodiments, the digital neural network component 230 includes a convolutional neural network (CNN).

A convolutional neural network (CNN) can be configured based on a presumption that inputs to the neural network correspond to image pixel data for an image or other data that includes features at multiple spatial locations. For example, sets of inputs can form a multi-dimensional data structure, such as a tensor, that represent color features of an example digital image (e.g., an image of the surroundings of a vehicle). In some implementations, inputs to the neural network correspond to a variety of other types of data, such as data obtained from different devices and sensors of a vehicle, point cloud data, audio data that includes certain features or raw audio at each of multiple time steps, or various types of one-dimensional or multiple dimensional data. A convolutional layer of the convolutional neural network can process the inputs to transform features of the image that are represented by inputs of the data structure. For example, the inputs are processed by performing dot product operations using input data along a given dimension of the data structure and a set of parameters for the convolutional layer.

Performing computations for a convolutional layer can include applying one or more sets of kernels to portions of inputs in the data structure. The manner in which a system performs the computations can be based on specific properties for each layer of an example multi-layer neural network or deep neural network that supports deep neural net workloads. A deep neural network can include one or more convolutional towers (or layers) along with other computational layers. In particular, for example computer vision applications, these convolutional towers often account for a large proportion of the inference calculations that are performed. Convolutional layers of a CNN can have sets of artificial neurons that are arranged in three dimensions, a width dimension, a height dimension, and a depth dimension. The depth dimension corresponds to a third dimension of an input or activation volume and can represent respective color channels of an image. For example, input images can form an input volume of data (e.g., activations), and the volume has dimensions 32×32×3 (width, height, depth respectively). A depth dimension of 3 can correspond to the RGB color channels of red (R), green (G), and blue (B). Although described as being arranged in three dimensions, the artificial neurons can be arranged in more or fewer dimensions. For example, the artificial neurons can be arranged in one dimension, which can be a time dimension, or can be arranged in four dimensions, which can include a width, height, depth, and time dimensions.

In general, layers of a CNN are configured to transform the three dimensional input volume (inputs) to a multi-dimensional output volume of neuron activations (activations). For example, a 3D input structure of 32×32×3 holds the raw pixel values of an example image, in this case an image of width 32, height 32, and with three color channels, R,G,B. A convolutional layer of a neural network of the digital neural network component 230 computes the output of neurons that may be connected to local regions in the input volume. Each neuron in the convolutional layer can be connected only to a local region in the input volume spatially, but to the full depth (e.g., all color channels) of the input volume. For a set of neurons at the convolutional layer, the layer computes a dot product between the parameters (weights) for the neurons and a certain region in the input volume to which the neurons are connected. This computation may result in a volume such as 32×32×12, where 12 corresponds to a number of kernels that are used for the computation. A neuron's connection to inputs of a region can have a spatial extent along the depth axis that is equal to the depth of the input volume. The spatial extent corresponds to spatial dimensions (e.g., x and y dimensions) of a kernel.

A set of kernels can have spatial characteristics that include a width and a height and that extends through a depth of the input volume. Each set of kernels for the layer is applied to one or more sets of inputs provided to the layer. That is, for each kernel or set of kernels, the digital neural network component 230 can overlay the kernel, which can be represented multi-dimensionally, over a first portion of layer inputs (e.g., that form an input volume or input tensor), which can be represented multi-dimensionally. For example, a set of kernels for a first layer of a CNN may have size 5×5×3×16, corresponding to a width of 5 pixels, a height of 5 pixel, a depth of 3 that corresponds to the color channels of the input volume to which to a kernel is being applied, and an output dimension of 16 that corresponds to a number of output channels. In this context, the set of kernels includes 16 kernels so that an output of the convolution has a depth dimension of 16.

The digital neural network component 230 can then compute a dot product from the overlapped elements. For example, the digital neural network component 230 can convolve (or slide) each kernel across the width and height of the input volume and compute dot products between the entries of the kernel and inputs for a position or region of the image. Each output value in a convolution output is the result of a dot product between a kernel and some set of inputs from an example input tensor. The dot product can result in a convolution output that corresponds to a single layer input, e.g., an activation element that has an upper-left position in the overlapped multi-dimensional space. As discussed above, a neuron of a convolutional layer can be connected to a region of the input volume that includes multiple inputs. The digital neural network component 230 can convolve each kernel over each input of an input volume. The digital neural network component 230 performs this convolution operation by, for example, moving (or sliding) each kernel over each input in the region.

The digital neural network component 230 moves each kernel over inputs of the region based on a stride value for a given convolutional layer. For example, when the stride is set to 1, then the digital neural network component 230 moves the kernels over the region one pixel (or input) at a time. Likewise, when the stride is 2, then the digital neural network component 230 moves the kernels over the region two pixels at a time. Thus, kernels may be shifted based on a stride value for a layer and the digital neural network component 230 can repeatedly perform this process until inputs for the region have a corresponding dot product. Related to the stride value is a skip value. The skip value can identify one or more sets of inputs (2×2), in a region of the input volume, that are skipped when inputs are loaded for processing at a neural network layer. In some implementations, an input volume of pixels for an image can be "padded" with zeros, e.g., around a border region of an image. This zero-padding is used to control the spatial size of the output volumes.

As discussed previously, a convolutional layer of CNN is configured to transform a three dimensional input volume (inputs of the region) to a multi-dimensional output volume of neuron activations. For example, as the kernel is convolved over the width and height of the input volume, the digital neural network component 230 produces a multi-dimensional activation map that includes results of convolving the kernel at one or more spatial positions based on the stride value. In some cases, increasing the stride value produces smaller output volumes of activations spatially. In some implementations, an activation can be applied to outputs of the convolution before the outputs are sent to a subsequent layer of the neural network.

An example convolutional layer can have one or more control parameters for the layer that represent properties of the layer. For example, the control parameters can include a number of kernels, K, the spatial extent of the kernels, F, the stride (or skip), S, and the amount of zero padding, P. Numerical values for these parameters, the inputs to the layer, and the parameter values of the kernel for the layer shape the computations that occur at the layer and the size of the output volume for the layer. In one implementation, the spatial size of the output volume is computed as a function of the input volume size, W, using the formula $(W-F+2P)/S+1$. For example, an input tensor can represent a pixel input volume of size $[227 \times 227 \times 3]$. A convolutional layer of a neural network can have a spatial extent value of $F=11$, a stride value of $S=4$, and no zero-padding $(P=0)$. Using the above formula and a layer kernel quantity of $K=96$, the digital neural network component 230 performs computations for the layer that results in a convolutional layer output volume of size $[55 \times 55 \times 96]$, where 55 is obtained from $[(227-11+0)/4+1=55]$.

The computations (e.g., dot product computations) for a convolutional layer, or other layers, of a neural network involve performing mathematical operations, e.g., multiplication and addition, using a computation unit of a hardware circuit of the digital neural network component 230. The design of a hardware circuit can cause a system to be limited in its ability to fully utilize computing cells of the circuit when performing computations for layers of a neural network.

In some implementations, the digital neural network component 230 includes other types of digital neural networks, such as a recurrent neural network, a radial basis neural network, a deconvolution network, and so forth. While the hybrid neural network 200 is shown to have a specific configuration, the configuration of the hybrid neural network 200 is not so limited in some implementations. For example, the hybrid neural network 200 can include a second digital neural network component (or more). In some implementations, the physical neural network component 220 is set between two digital neural network components. This and other configurations are contemplated and the configuration of the components of the hybrid neural network can be determined by using method discussed later in this specification with reference to FIG. 4.

Figure 3:
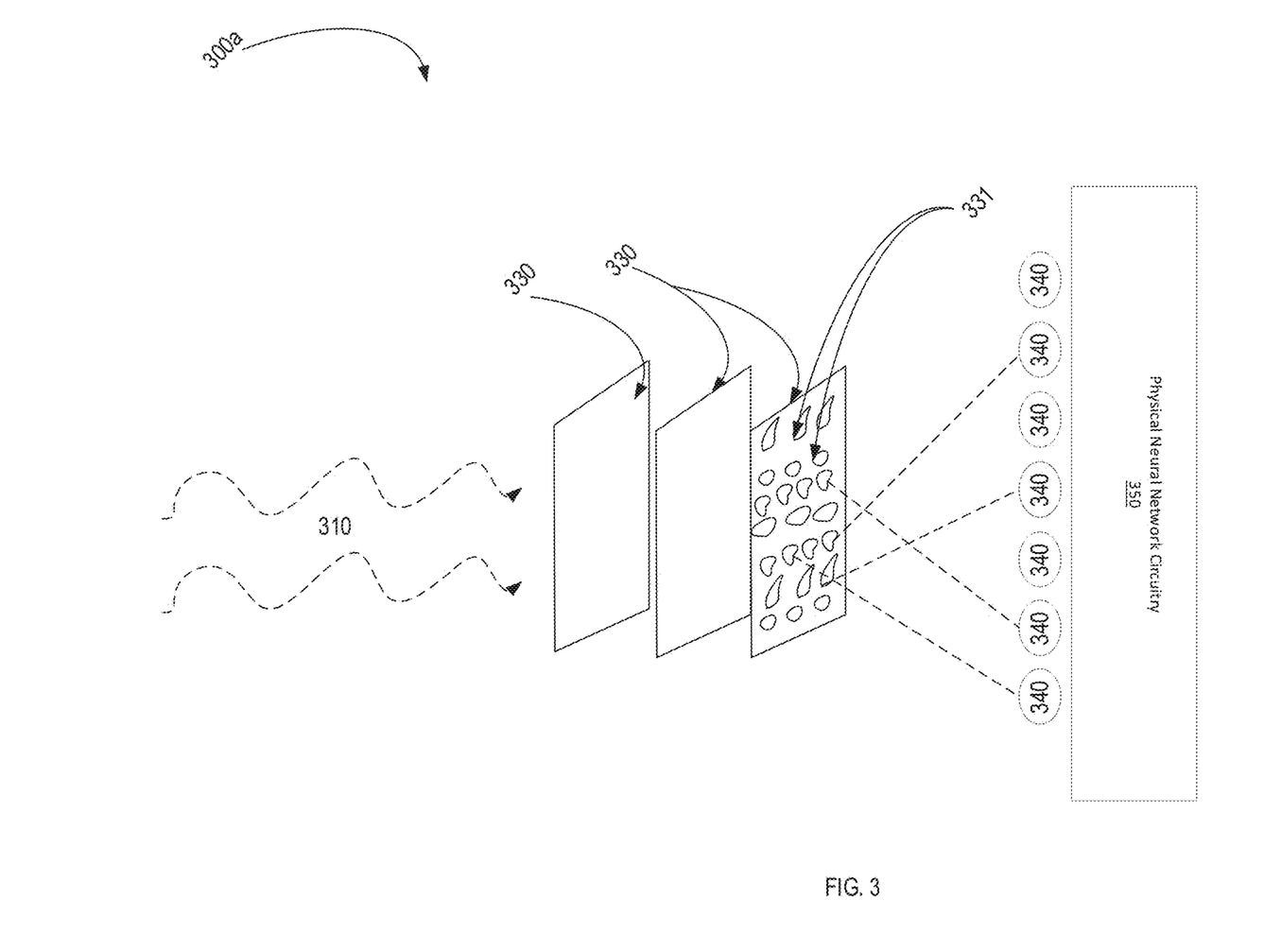
FIG. 3 shows an example of a final structure for a physical neural network component of a hybrid physical/digital neural network system.

FIG. 3 shows an example of a physical neural network component 300. The physical neural network component 300 includes a scattering volume 330, one or more detectors 340, and physical neural network circuitry 350. Although described as having a scattering volume 330, and a physical neural network circuitry 350, the physical neural network component 300 can include some or all of these features in some embodiments. For example, in some embodiments, the physical neural network component 300 only includes the one or more scattering plates 330. In some embodiments, the physical neural network component 300 only includes the physical neural network circuitry 350.

In some embodiments, the scattering volume 330 includes one or more scattering plates. In some embodiments, the scattering volume 330 includes periodic subwavelength metal and/or dielectric structures. The structures can resonantly couple to electromagnetic components of incident electromagnetic fields. In some embodiments, at least a portion of the scattering volume 330 is planar with subwavelength thickness. At least a portion of the scattering volume 330 can be fabricated using lithography and/or nanoprinting methods. In some embodiments, the scattering volume 330 includes negative-index metamaterial, which refers to material that has a refractive index of a negative value over some frequency range. In some embodiments, the scattering volume 330 includes nonlinear material, which refers to material that has a refractive index dependent on the intensity of the input signal 310. In some embodiments, the scattering volume 330 includes a substrate, such as silicon for example. In some embodiments, the substrate has high resistive properties. In some embodiments, the scattering volume 330 includes metasurfaces. In some embodiments, the scattering volume 330 includes polymer wafers having uneven surfaces that can diffract the input signal 310 in different directions. In some embodiments, at least a portion of the scattering volume 330 includes translucent, refracting surfaces that can redirect portions of the input signal 310 to specific locations. In some embodiments, the scattering volume 330 includes one or more resonators, which, when excited, can result in a highly localized field intensity.

In some embodiments, one or more of the scattering volume 330 includes one or more physical features 331. In some embodiments, the physical features 331 include optical features such as subwavelength antennas, which can be metallic (e.g., gold) and configured to modulate incident light. When the input signal 310 is light and interacts with the scattering volume 330, the physical features 331 cooperate to cause the input signal 310 to either refract, diffract and/or reflect in accordance with a predetermined convolution algorithm. In some embodiments, the scattering volume 330 cause at least some portions of the input signal 310 to separate by refracting the portions of the input signal 310. In some embodiments, the physical features 331 are openings in the scattering volume 330, which can cause portions of the input signal 310 to diffract in accordance with the properties of the incident input signal 310. In some embodiments, the physical features 331 include curvatures configured to reflect the input signal 310 in accordance with the properties of the light 310.

In some embodiments, the physical neural network 300 include one or more detectors 340 (e.g., physical structures) configured to receive the input signal 310. Although the detectors 340 are shown as a 1-dimensional array, in some embodiments, the detectors 340 are arranged in a 2-dimensional N×N array. For example, the detectors 340 can be arranged in a 256×256 array, a 500×500 array, a 1250×1250 array, and so forth. In some embodiments, the detectors 340 are photo-sensors configured convert the received light photons into an electrical current. In some embodiments, the detectors 340 are acoustic wave sensors configured to convert an incident acoustic wave into an electrical current.

The physical neural network circuitry 350 is configured to perform physical convolutions on the input signal 310. In some embodiments, the physical neural network circuitry 350 includes physical structures such as photonic integrated circuits configured to perform optical convolutions on the input signal 310. Photonic integrated circuits can include, for example, amplifiers, modulators, filters, waveguides, power splitters, and so forth. In these instances, the physical neural network circuitry 350 can include means, such as optoelectronic devices, to convert an electrical signal from the detectors 340 to an optical signal. In some embodiments, the physical neural network circuitry 350 includes physical structures that include electrical components, such as memristors, configured to perform physical convolutions on the input signal 310. Memristors may replicate biological neurons by limiting and/or regulating the flow of electrical current in a circuit and remembering the amount of charge that has previously flowed through it.

Figure 4:
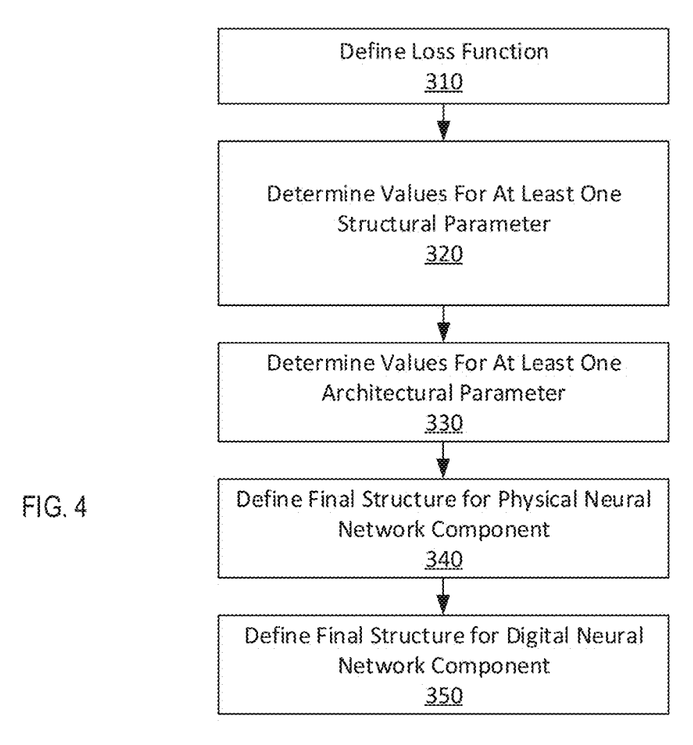
FIG. 4 depicts a flowchart showing a method for designing a hybrid physical/digital neural network.

FIG. 3 depicts a flowchart showing a method 300 for designing a hybrid physical/digital neural network. The hybrid physical/digital neural network can be similar to the hybrid physical/digital neural network 200 of FIG. 2 in that it can include a physical neural network component and a digital neural network component. The method includes defining a loss function (block 310), determining values for at least one structural parameter (block 320), determine values for at least one architectural parameter (block 330), defining a final structure for a physical neural network component (block 340) and defining a final structure for the digital neural network component (block 350).

At block 310, a loss function is defined within a design space encompassing the hybrid neural network. In some implementations, the loss function corresponds to an output of the digital neural network component resulting from an interaction between an input signal having an operative wavelength of the one or more physical structures (e.g., scattering plates, photonic integrated circuits, electronic integrated circuits, etc.) of the at least one physical neural network component. In some embodiments, the input wave is an acoustic wave. In some embodiments, the input wave is an electromagnetic wave. In some embodiments, the physical neural network component includes a scattering volume, one or more photonic integrated circuits, one or more detectors, and/or one or more electrical components.

In some implementations, the loss function is based on at least one inference metric of the digital neural network component. An inference metric can be, for example, associated with the inference accuracy of the digital neural network component, an error amount and/or an inference speed. In some implementations, the loss function can account for manufacturing cost, feasibility, and/or materials available. For example, it may not be feasible to design some of the optical interfaces of the optical device with more than one material. It may not be feasible for the optical interfaces to include curvatures less than a certain size. Due to budget considerations, it may not be feasible to make the optical interfaces out of extraordinarily expensive materials. The loss function can account for these considerations and treat them as penalties.

At block 320, values are determined for at least one functional parameter of the one or more physical structures of the physical neural network component. Determined values can be associated with a type, thickness, length, composition, and/or shape of an optical interface, such as the optical features of a scattering volume (e.g., holes, curvatures, antennas, etc). In some implementations, the determined values are associated with the thickness, composition, and/or shape of one or more scattering plates of the initial structure. As another example, a refractive index (i.e., functional parameter) can be determined for the one or more optical interfaces, such as the optical features of the scattering plates. Examples of other functional parameters that can be determined include values associated with the angle of diffraction of each optical interface, values associated with the amount of reflectivity of each optical interface, values associated with permittivity, values associated with transmissivity, and values associated with magnetic permeability. In some implementation, the amount of electronic noise introduced by the electronic components of the physical neural network circuitry (including the photo-sensor array) is determined. The values are determined by solving Maxwell's equations to optimize the loss function in accordance with the initially defined structure. For example, the values can be determined such that a loss (e.g., as defined in terms of signal-to-noise ratio and/or pixel loss value), in accordance with the defined loss function, is within a target loss threshold. Thus, values of the structural and functional parameters of the physical features of the physical neural network component can be determined in such a manner that loss is minimized (or maximized). In some implementations, the Maxwell's equations are solved using a finite-difference time domain solver. In some implementations, the finite-difference time domain solver includes the computational inverse design tool 100 described earlier with reference to FIG. 1A.

At block 330, values are determined for at least one architectural parameter of the digital neural network component. For example, for each iterative change of the physical features during the simulation process, values associated with the inference accuracy of each digital neural network layer and/or computational speed of each layer can be determined. Thus, for each iterative change in the physical neural network component, the digital neural network component can also be optimized for performing a specified task (e.g., image recognition, image reconstruction, voice recognition, etc.).

At block 340, a final structure for the one or more physical devices is defined based on the determined values of the structural and/or functional parameters. The final structure for the one or more physical devices can include one or more physical features. For example, based on the determined values, the material composition, and spatial distribution of the material composition, for each physical device can be determined. As another example, substrates and components used in an integrated circuit (e.g., photonic and/or electronic). Examples of final structures that can be determined also include the type of material to use for a scattering volume, spacing between components of the scattering volume (for example, spacing between scattering plates included in the scattering volume), the number and locations of optical features to include in the scattering medium, the number and type of electronic/photonic components used in an integrated circuit, the shape of each physical feature on the scattering medium (for example, the curvature of a scattering plate included in the scattering medium), the type of detectors to use for each detector of the detector array, and so forth.

At block 350, a final architectural structure for the digital neural network component is defined based on the determined architectural parameters. For example, the values of weights and biases at each layer of the digital neural network can be defined based on the determined values. Additionally, or alternatively, the number of layers, type of layers, size of kernals at each layer, and/or size of stride at each layer can be determined for the digital neural network. Thus, in some implementations, the architecture of the digital neural network processing system is defined to minimize loss (e.g., as defined in terms of accuracy and/or speed) of the output of the digital neural network based on the final structure of the physical neural network component.

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands—or even millions—of design choices, test configurations and learn from each iterative solution. Thus, aspects of the described implementations may use the machine learning engines in a generative design process to generate unique and bespoke solutions beyond those that a human being, alone, could create, to arrive at the desired design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

Figure 5:
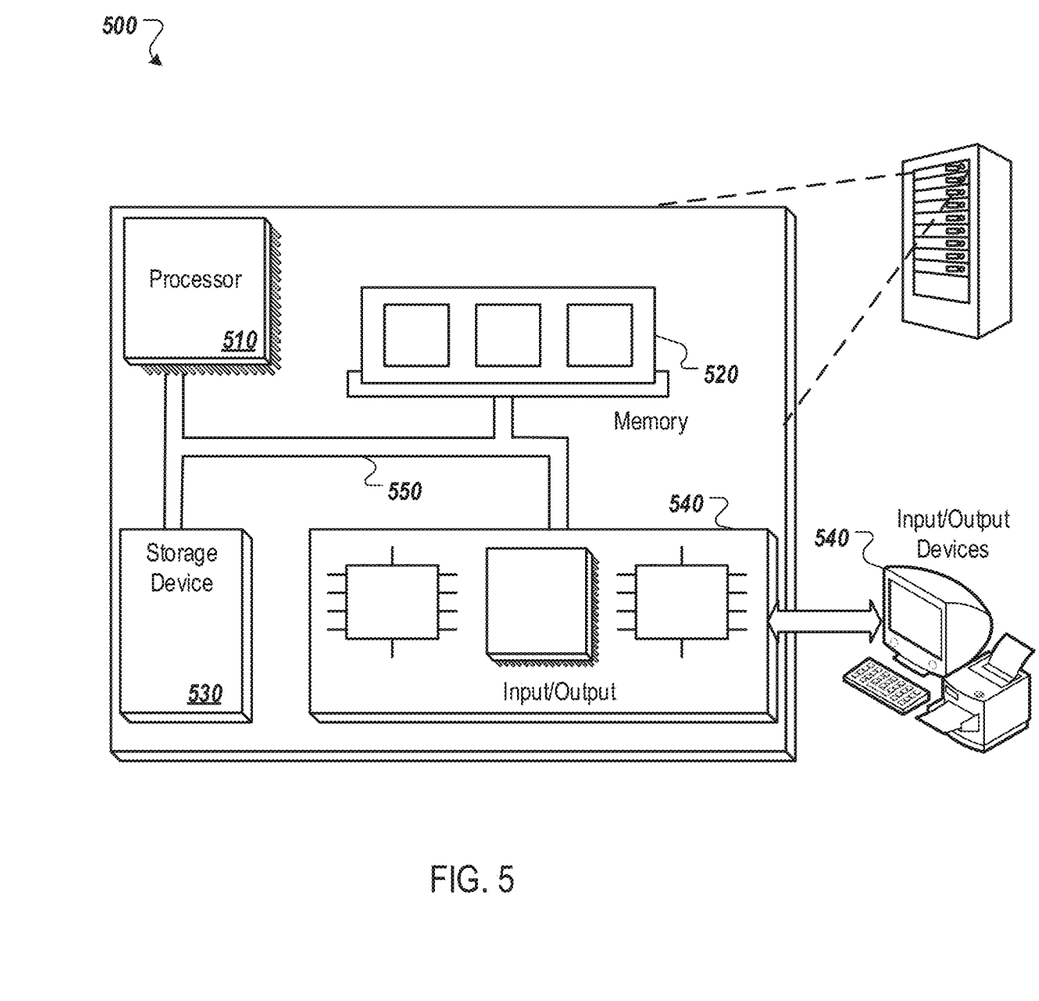
FIG. 5 is a schematic diagram of an example computer system.

FIG. 5 is a schematic diagram of an example computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for designing a hybrid neural network comprising at least one physical neural network component having one or more physical structures and configured to perform physical computations and at least one digital neural network component having one or more architectural features and configured to perform digital computations, the method comprising:
    defining a loss function within a design space composed of a plurality of voxels, the design space encompassing the one or more physical structures of the at least one physical neural network component and the one or more architectural features of the at least one digital neural network component, the loss function corresponding to at least one inference metric of the hybrid neural network resulting from:
        an interaction between an input signal at an operative wavelength of the one or more physical structures of the at least one physical neural network component; and
        processing, by the at least one digital neural network component, the result of the interaction between the input signal and the one or more physical structures of the at least one physical neural network component;
    determining, using a computer system, values for at least one functional parameter for the one or more physical structures, and at least one architectural parameter for the one or more architectural features, using a domain solver to solve Maxwell's equations so that a loss determined according to the loss function is within a threshold loss, wherein the at least one functional parameter corresponds to a structure of the at least one physical neural network component, and wherein the at least one architectural parameter corresponds to an architectural structure of the at least one digital neural network component;
    defining a final structure of the at least one physical neural network component based on the values for the at least one structural parameter; and
    defining a final architectural structure of the at least one digital neural network component based on the values for the at least one architectural parameter.

2. The method of claim 1, wherein the final structure of the at least one physical neural network component includes one of more physical features, the one or more physical features including at least one of: a curvature of a scattering plate, a spacing between scattering plates, a substrate, a beam splitter, an amplifier or a modulator.

3. The method of claim 1, wherein the one or more architectural features include at least one of: a number of neural network layers, a type of neural network layers, a number of neural network neurons, or a number of neural network channels.

4. The method of claim 1, wherein the at least one inference metric of the hybrid neural network includes at least one of an inference speed or an inference accuracy.

5. The method of claim 1, wherein the input signal includes at least one of an electromagnetic wave or an acoustic wave.

6. The method of claim 1, wherein the at least one functional parameter includes at least one of: a refractive index, a reflection angle, a diffraction angle, or a transmissivity value.

7. The method of claim 1, wherein the at least one architectural parameter includes at least one of a weight value or a bias value.

8. The method of claim 1, wherein the domain solver includes a finite difference time domain solver.

9. The method of claim 1, wherein the physical computations comprise physical convolutions and the digital computations comprise digital convolutions.

10. A system for designing a hybrid neural network comprising at least one physical neural network component having one or more physical structures and configured to perform physical computations and at least one digital neural network component having one or more architectural features and configured to perform digital computations, the system comprising:
one or more processors; and
computer storage storing executable computer instructions in which, when executed by the one or more processors, cause the one or more processors to perform operations comprising:
defining a loss function within a design space composed of a plurality of voxels, the design space encompassing the one or more physical structures of the at least one physical neural network component, and the one or more architectural features of the at least one digital neural network component, the loss function corresponding to at least one inference metric of the neural network resulting from:
an interaction between an input signal at an operative wavelength of the one or more physical structures of the at least one physical neural network component; and
processing, by the at least one digital neural network component, the result of the interaction between the input signal and the one or more physical structures of the at least one physical neural network component;
determining values for at least one functional parameter for the one or more physical structures, and at least one architectural parameter for the one or more architectural features, using a domain solver to solve Maxwell's equations so that a loss determined according to the loss function is within a threshold loss, wherein the at least one functional parameter corresponds to a structure of the at least one physical neural network component, and wherein the at least one architectural parameter corresponds to an architectural structure of the at least one digital neural network component;
defining a final structure of the at least one physical neural network component based on the values for the at least one structural parameter; and
defining a final architectural structure of the at least one digital neural network component based on the values for the at least one architectural parameter.

11. The system of claim 10, wherein the final structure of the at least one physical neural network component includes one of more physical features, the one or more physical features including at least one of: a curvature of a scattering plate, a spacing between scattering plates, a substrate, a beam splitter, an amplifier or a modulator.

12. The system of claim 10, wherein the one or more architectural features include at least one of: a number of neural network layers, a type of neural network layers, a number of neural network neurons, or a number of neural network channels.

13. The system of claim 10, wherein the at least one inference metric of the hybrid neural network includes at least one of an inference speed or an inference accuracy.

14. The system of claim 10, wherein the input signal includes at least one of an electromagnetic wave or an acoustic wave.

15. The system of claim 10, wherein the at least one functional parameter includes at least one of: a refractive index, a reflection angle, a diffraction angle, or a transmissivity value.

16. The system of claim 10, wherein the at least one architectural parameter includes at least one of a weight value or a bias value.

17. The system of claim 10, wherein the domain solver includes a finite difference time domain solver.

18. The system of claim 10, wherein the physical computations comprise physical convolutions and the digital computations comprise digital convolutions.

19. A neural network comprising:
at least one physical neural network component having one or more physical structures and configured to perform physical computations; and
at least one digital neural network component having one or more architectural features and configured to perform digital computations, the system comprising:
wherein the at least one physical neural network component and the at least one digital neural network component are designed by:
determining values for at least one functional parameter for the one or more physical structures of the at least one physical neural network component, and at least one architectural parameter for the one or more architectural features of the at least one digital neural network component, using a domain solver to solve Maxwell's equations so that a loss determined according to a loss function is within a threshold loss;
defining a final structure of the at least one physical neural network component based on the values for the at least one structural parameter; and
defining a final architectural structure of the at least one digital neural network component based on the values for the at least one architectural parameter.

20. The neural network of claim 19, wherein:
the loss function is defined within a design space composed of a plurality of voxels, the design space encompassing the one or more physical structures of the at least one physical neural network component, and the one or more architectural features of the at least one digital neural network component, the loss function corresponding to at least one inference metric of the neural network resulting from:
an interaction between an input signal at an operative wavelength of the one or more physical structures of the at least one physical neural network component; and
processing, by the at least one digital neural network component, the result of the interaction between the input signal and the one or more physical structures of the at least one physical neural network component.

* * * * *